(12) United States Patent
Fan et al.

(10) Patent No.: US 10,877,639 B2
(45) Date of Patent: Dec. 29, 2020

(54) PAGE SHORTCUT DISPLAY METHOD, APPARATUS, TERMINAL, AND SERVER, AND STORAGE MEDIUM

(71) Applicant: TENCENT TECHNOLOGY (SHENZHEN) COMPANY LIMITED, Shenzhen (CN)

(72) Inventors: Zenghui Fan, Shenzhen (CN); Jiaxin Wu, Shenzhen (CN); Chaoqiang Zhou, Shenzhen (CN); Guangzhen Yu, Shenzhen (CN); Yichao Geng, Shenzhen (CN); Fei Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/363,437

(22) Filed: Mar. 25, 2019

(65) Prior Publication Data

US 2019/0220159 A1    Jul. 18, 2019

Related U.S. Application Data

(63) Continuation of application No. PCT/CN2018/073629, filed on Jan. 22, 2018.

(30) Foreign Application Priority Data

Jan. 22, 2017 (CN) .......................... 2017 1 0052935

(51) Int. Cl.
*G06F 3/0484* (2013.01)
*G06F 3/0483* (2013.01)
(Continued)

(52) U.S. Cl.
CPC .......... *G06F 3/0484* (2013.01); *G06F 3/0483* (2013.01); *G06F 3/04817* (2013.01); *H04L 67/22* (2013.01)

(58) Field of Classification Search
CPC ...................................................... H04L 67/22
(Continued)

(56) References Cited

U.S. PATENT DOCUMENTS

2009/0183124 A1* 7/2009 Sridhar ................... G06F 3/048 715/847
2009/0222737 A1* 9/2009 Liesche .................. H04L 67/22 715/738

(Continued)

FOREIGN PATENT DOCUMENTS

CN    103885992 A    6/2014
CN    104484193 A    4/2015
(Continued)

OTHER PUBLICATIONS

The World Intellectual Property Organization (WIPO) International Search Report for PCT/CN2018/073629 dated Apr. 24, 2018 6 Pages (including translation).

*Primary Examiner* — Daniel Samwel
(74) *Attorney, Agent, or Firm* — Anova Law Group, PLLC

(57) ABSTRACT

A page display method is provided. The method includes determining a first page based on a first operation on a client; and obtaining, in response to the first operation on the client, current scenario information of the client and a first target page set that is generated according to a page jump historical record of the first page. The method also includes determining a second target page set corresponding to the current scenario information according to a correspondence between scenario information and target pages in the first target page set; creating a corresponding page-entry control (Continued)

for at least one page in the second target page set; and displaying the first page and the page-entry control for at least one page.

15 Claims, 13 Drawing Sheets

(51) Int. Cl.
*G06F 3/0481* (2013.01)
*H04L 29/08* (2006.01)

(58) Field of Classification Search
USPC .................................................. 715/700–866
See application file for complete search history.

(56) References Cited

U.S. PATENT DOCUMENTS

| | | | | |
|---|---|---|---|---|
| 2010/0036933 | A1* | 2/2010 | Breau | G06F 16/954 |
| | | | | 709/218 |
| 2013/0191409 | A1* | 7/2013 | Zeng | G06F 16/3322 |
| | | | | 707/767 |
| 2015/0277672 | A1* | 10/2015 | Wang | G06F 3/0482 |
| | | | | 715/811 |
| 2015/0363046 | A1 | 12/2015 | Peterson et al. | |
| 2016/0098158 | A1* | 4/2016 | Siquenique | G06F 3/0482 |
| | | | | 715/738 |

FOREIGN PATENT DOCUMENTS

| | | |
|---|---|---|
| CN | 105263054 A | 1/2016 |
| CN | 105786894 A | 7/2016 |

* cited by examiner

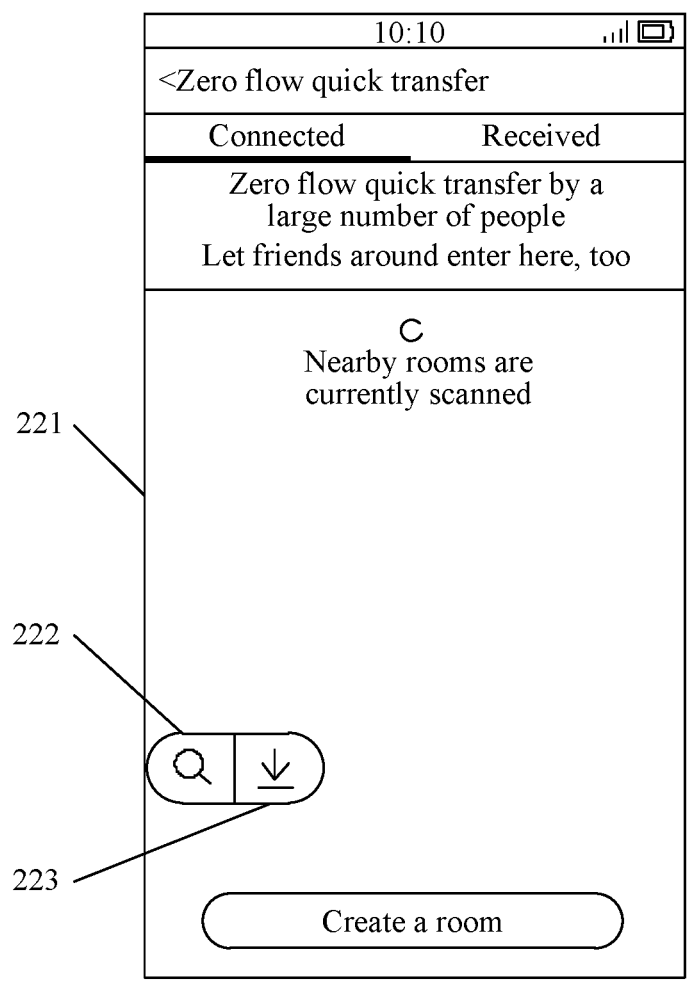
FIG. 2B-A

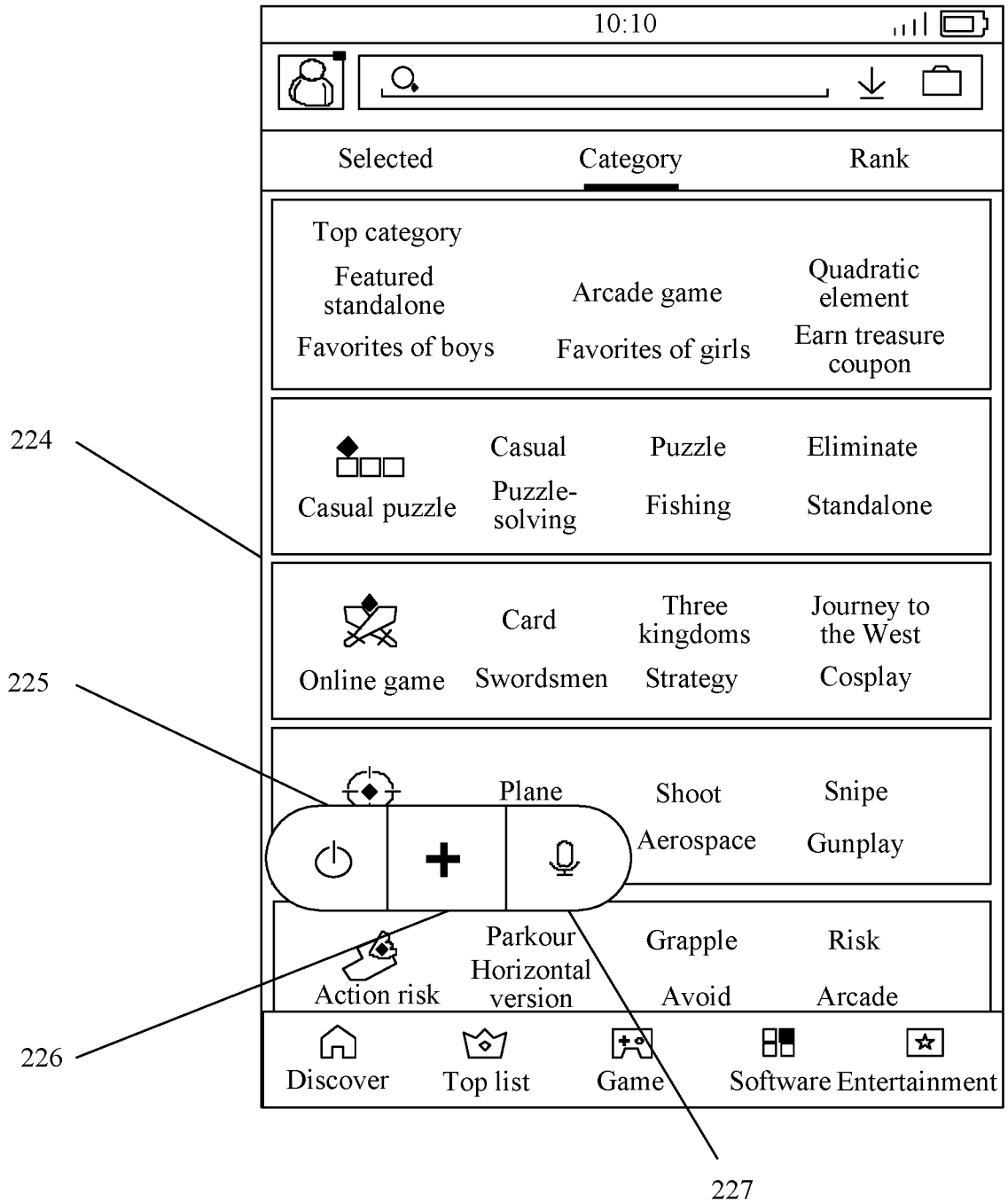
FIG. 2B-B

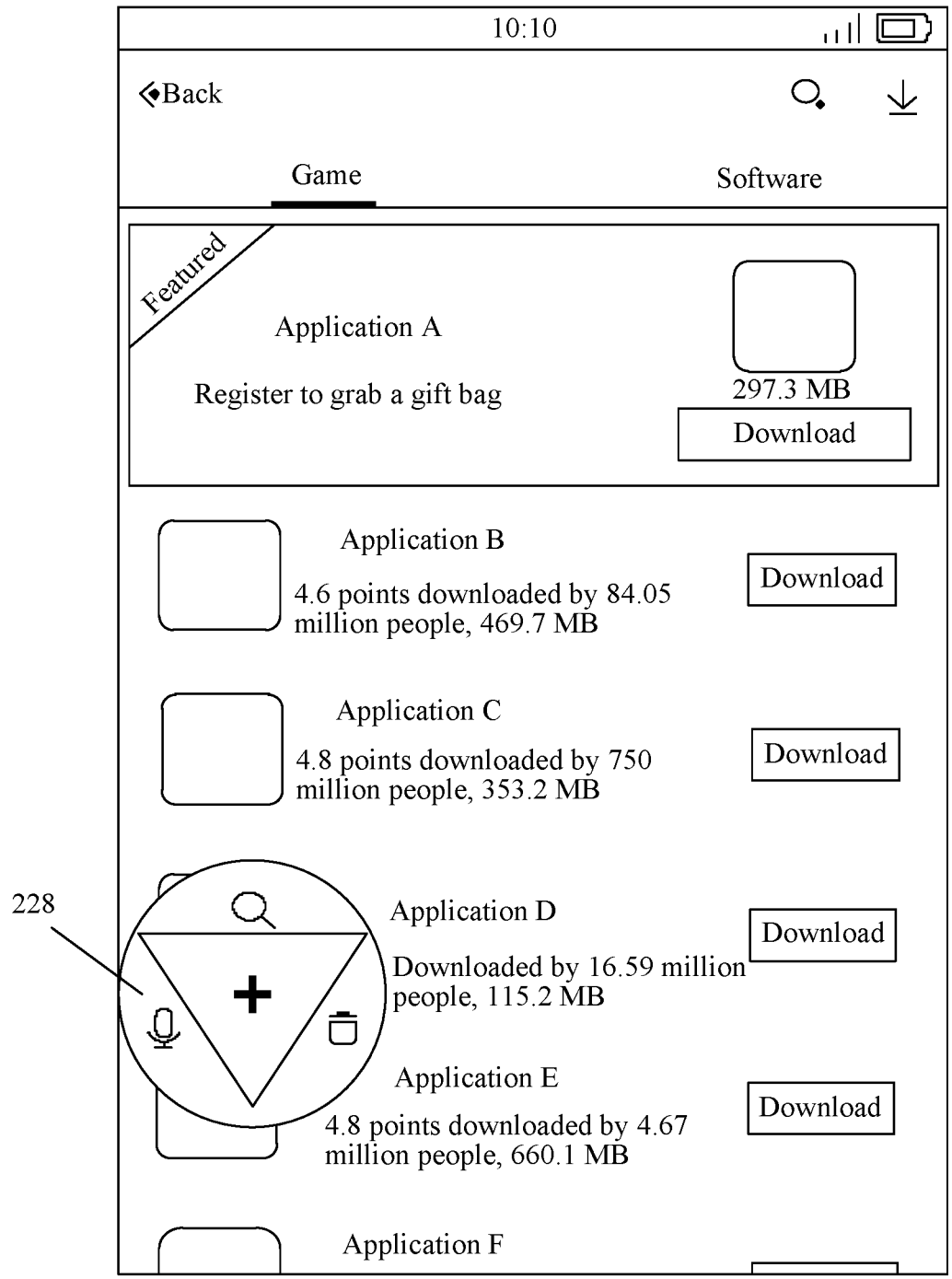
FIG. 2B-C

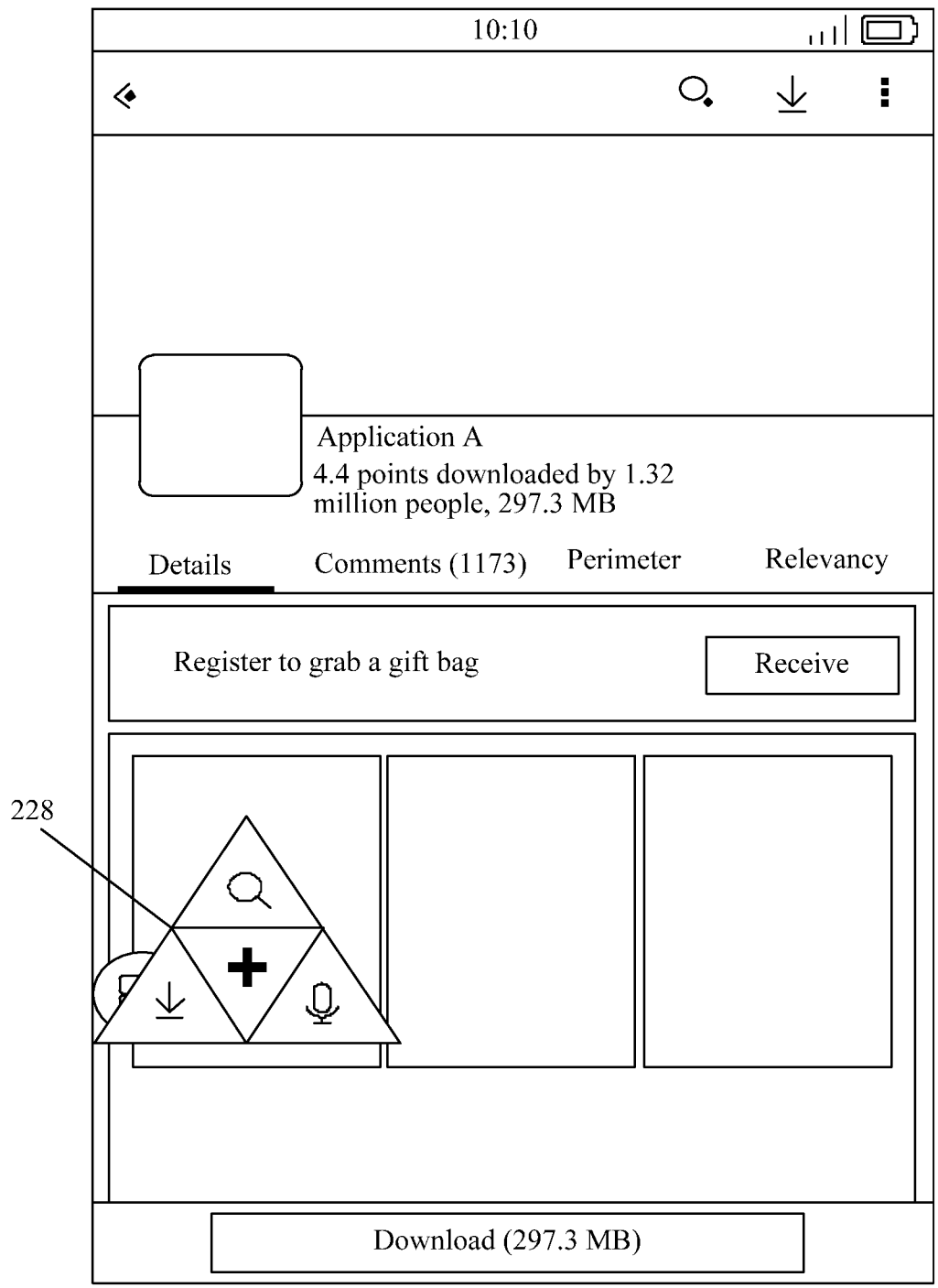
FIG. 2B-D

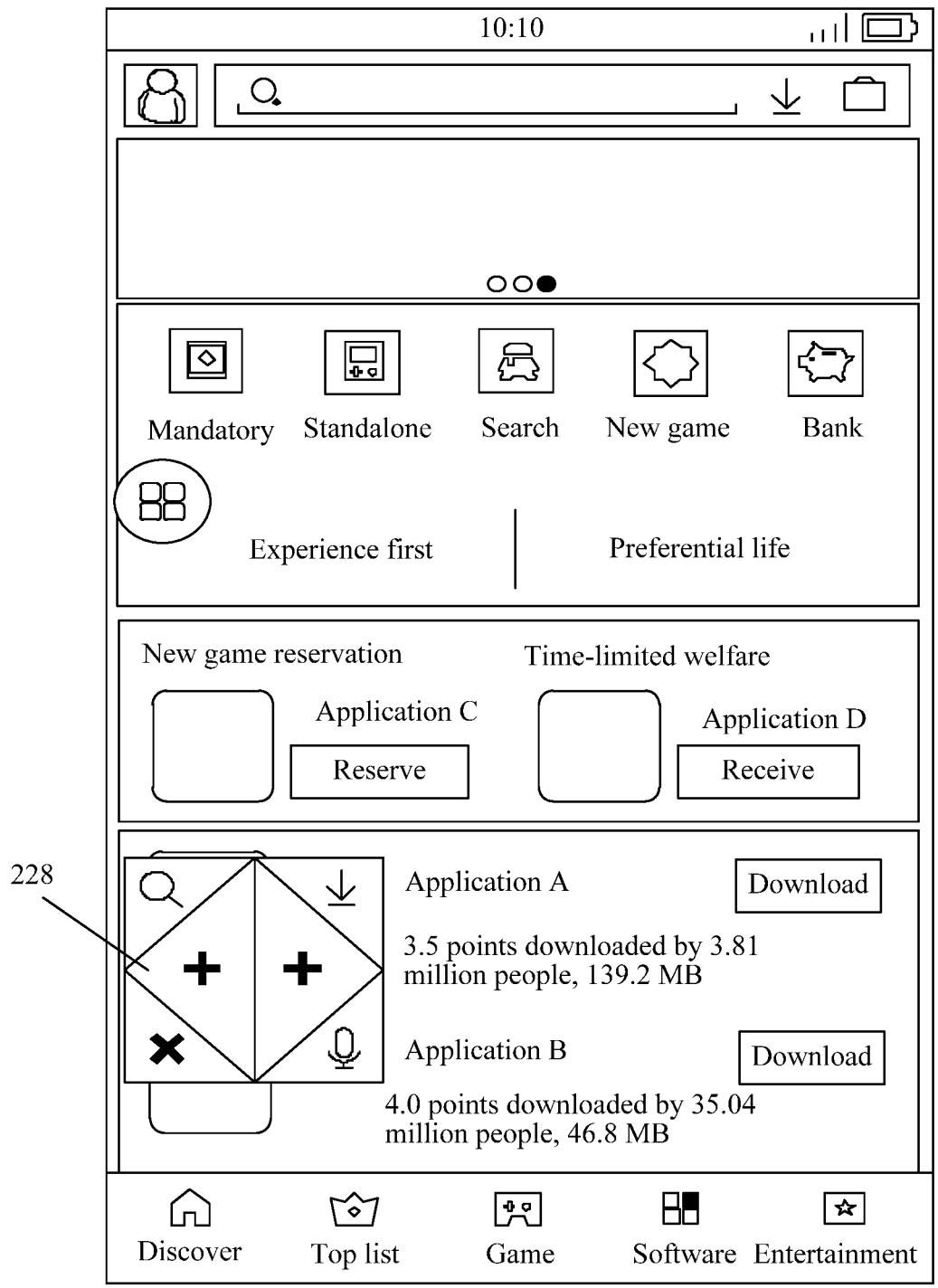
FIG. 2B-E

PAGE SHORTCUT DISPLAY METHOD, APPARATUS, TERMINAL, AND SERVER, AND STORAGE MEDIUM

RELATED APPLICATIONS

This application is a continuation application of PCT Patent Application No. PCT/CN2018/073629, filed on Jan. 22, 2018, which is based on and claims priority to Chinese Patent Application No. 2017100529358 filed on Jan. 22, 2017, content of all of which is incorporated by reference in its entirety.

FIELD OF TECHNOLOGY

The present disclosure relates to information processing technologies and, in particular, to a page display method, apparatus, terminal, and server, and a storage medium.

BACKGROUND OF THE DISCLOSURE

Currently, some applications (APPs) implement a function of defining a page entry by a user. There are usually two types of page entries in an APP. One type is a fixed page entry that has a fixed position and is usually located at a fixed position (for example, top or bottom) of a page, where the fixed page entry is placed in a navigation bar for a user to click to jump to another page; and the other type is a floating page entry, usually located at a fixed position (the lower left corner or lower right corner) of a page, where a floating control is created, and several page entries are added to the floating control.

For these two types, the fixed page entry is usually used on a relatively important page such as a home page of the APP. The manner of the navigation bar provides a user with an expectation, so that the user knows that clicking a specific entry can lead to a specific page. The advantage is that the user can quickly familiarize the user with the functions of the APP and find corresponding entries, but the disadvantage is the insufficient flexibility. The floating page entry is slightly more flexible. The manner of the floating window provides a user with several page entries. These entries are usually reserved for some functions for a user, but actually, such page entries may not be what the user really want, and are insufficiently accurate and intelligent.

The disclosed methods and systems are directed to solve one or more problems set forth above and other problems.

SUMMARY

Embodiments of the present invention provide a page display method, apparatus, terminal, and server, and a storage medium, to implement intelligence for a page entry, thereby improving product experience for a user.

One aspect of the present invention provides a page display method. The method includes determining a first page based on a first operation on a client; and obtaining, in response to the first operation on the client, current scenario information of the client and a first target page set that is generated according to a page jump historical record of the first page. The method also includes determining a second target page set corresponding to the current scenario information according to a correspondence between scenario information and target pages in the first target page set; creating a corresponding page-entry control for at least one page in the second target page set; and displaying the first page and the page-entry control for at least one page.

Another aspect of the present invention provides a terminal. The terminal includes a memory for storing program code; a display screen; and a first processor coupled to the memory and the display screen. The first processor is configured to determine a first page based on a first operation on a client; obtain, in response to the first operation on the client, current scenario information of the client and a first target page set that is generated according to a page jump historical record of the first page; determine a second target page set corresponding to the current scenario information according to a correspondence between scenario information and target pages in the first target page set; and create a corresponding page-entry control for at least one page in the second target page set. The display screen is configured to display the first page and the page-entry control for at least one page.

Another aspect of the present invention provides a server. The server includes a communication interface and a second processor. The communication interface is configured to: receive a page jump historical record sent by a client, the page jump historical record comprising start page identification information, target page identification information, and attribute information of at least one page jump operation, and the attribute information being used to represent scenario information of the client when the client executes the page jump operation; and send a correspondence between start pages and target page sets to the client. The second processor is configured to: generate a first correspondence between each start page and a first set according to the start page identification information, the first set comprising corresponding target page identification information and attribute information; generate a second correspondence between each piece of attribute information in the first set and at least one piece of target page identification information according to the attribute information; and generate a correspondence between start pages and target page sets according to the first correspondence and the second correspondence.

According to embodiments of the present invention, a client searches, in a first target page set generated according to a page jump historical record of a first page, for a corresponding second target page set according to current scenario information in response to a first operation of requesting to display the first page. In such a case, a page in the second target page set is a target page selected in a page jump operation by a user in a current scenario, that is, a page to which the user most expects to jump in the current scenario. Thus, a page-entry control generated for the page in the second target page set is a page entry that is most likely to be operated by the user. In this way, intelligence for a page entry is implemented, thereby improving product experience for the user.

Other aspects of the present disclosure can be understood by those skilled in the art in light of the description, the claims, and the drawings of the present disclosure.

BRIEF DESCRIPTION OF THE DRAWINGS

FIG. 2B-A to FIG. 2B-E are schematic diagrams of a page-entry control according to embodiments of the present invention;
FIG. 2C is another schematic flowchart of a page display method according to embodiments of the present invention;

DETAILED DESCRIPTION

Figure 1A:
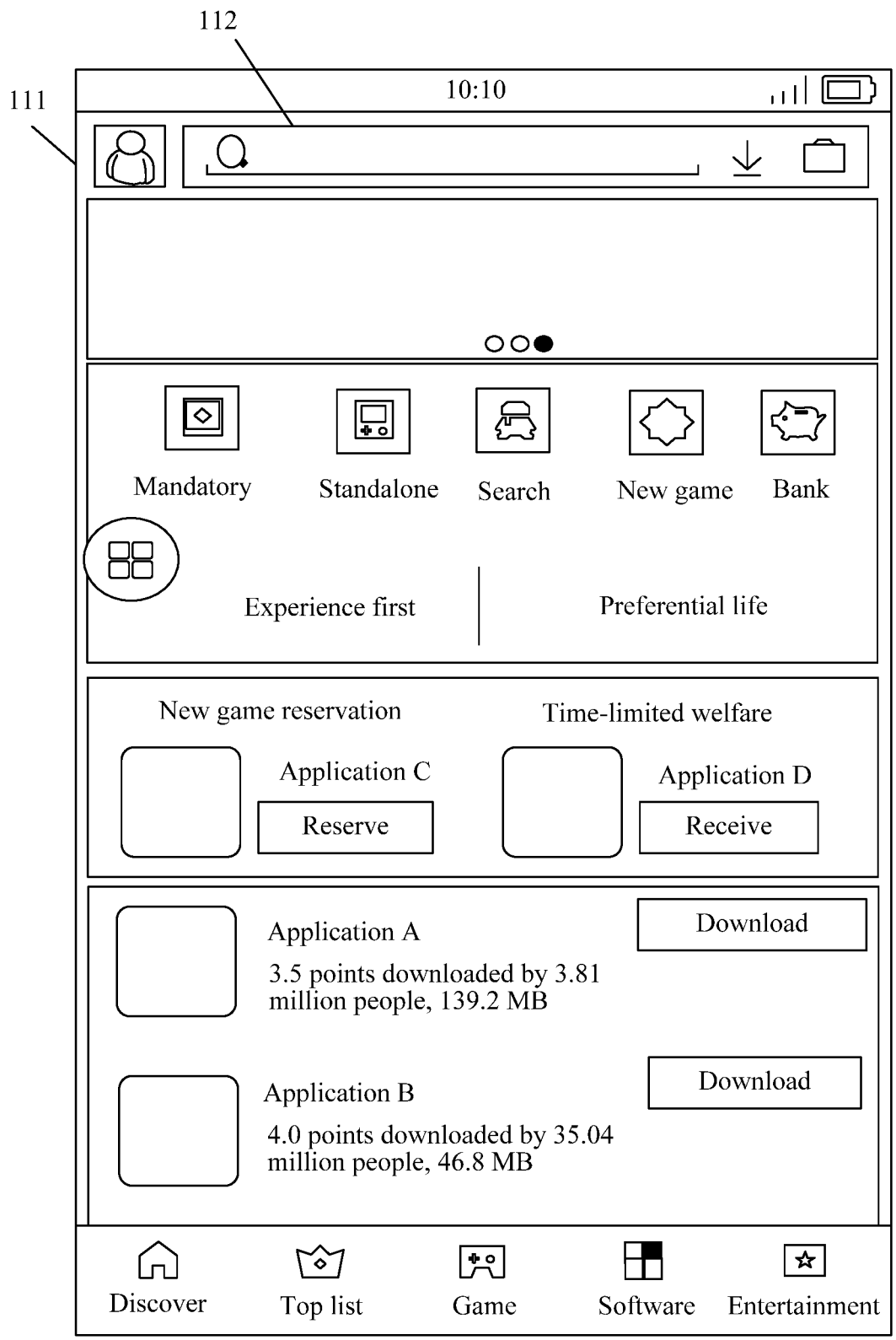
FIG. 1A is a schematic diagram of a fixed page entry.
Figure 1B:
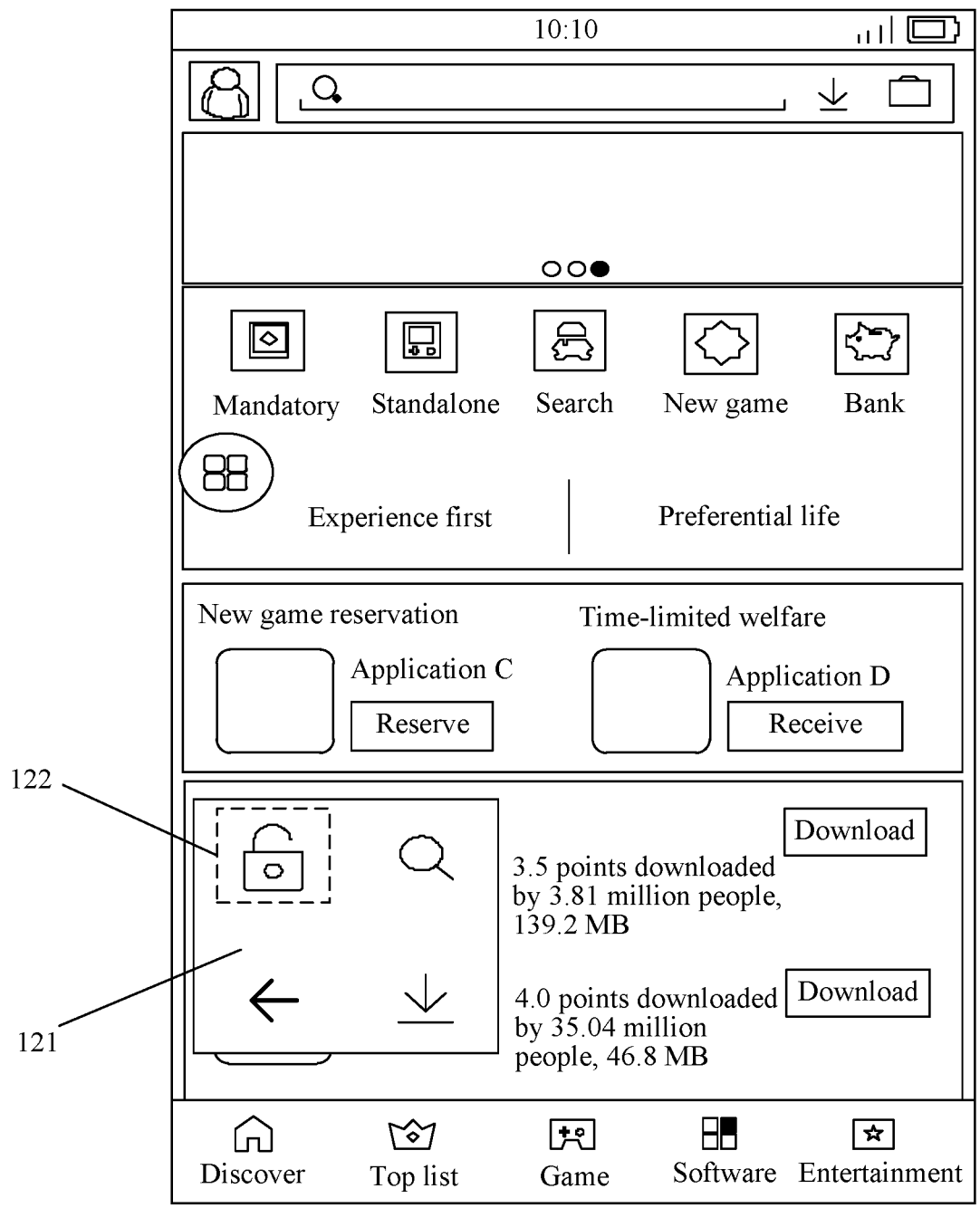
FIG. 1B is a schematic diagram of a floating page entry.

In general, there are two types of page entries in an APP. The first type is a fixed page entry, usually located at a fixed position (for example, top or bottom) of a page. As shown in FIG. 1A, a fixed page entry 112 is placed in a navigation bar 111, for a user to click to jump to another page. The other type is a floating page entry, usually located at a fixed position (the lower left corner or lower right corner) of a page. As shown in FIG. 1B, a floating control 121 is created, and several page entries 122 are added to the floating control 121.

For the fixed page entry, or the floating page entry, or other types of page entries that are provided by some APPs for a user, the provided page entries often need to be defined in advance, and the user is made to select only some therefrom. For example, even user-defined page entries are actually pre-disposed, and may not be page entries that are frequently used by the user or that the user expects to jump to.

To resolve the foregoing problems, an embodiment of the present invention provides a page display method. A client searches, in a first target page set generated according to a page jump historical record of a first page, for a corresponding second target page set according to current scenario information in response to a first operation of requesting to display the first page. In this case, a page in the second target page set is a target page selected in a page jump operation by a user in a current scenario, that is, a page to which the user most expects to jump in the current scenario. Therefore, a page-entry control generated for the page in the second target page set is a page entry that is most likely to be operated by the user. In this way, intelligence for a page entry is implemented, thereby improving product user-experience.

Technical solutions of the present disclosure are further described in detail below with reference to the accompanying drawings and embodiments.

An embodiment of the present invention provides a page display method. The method is applied to a client (an APP on a client terminal, or any application on a client terminal, etc.). The client may be installed on a terminal such as a smartphone, a tablet computer, a notebook computer, or a smart watch. The page display method may be implemented by invoking program code by a processor in the client terminal. Certainly, the program code may be stored in a computer storage medium. In view of this, the terminal includes at least a processor and a storage medium.

Figure 2A:
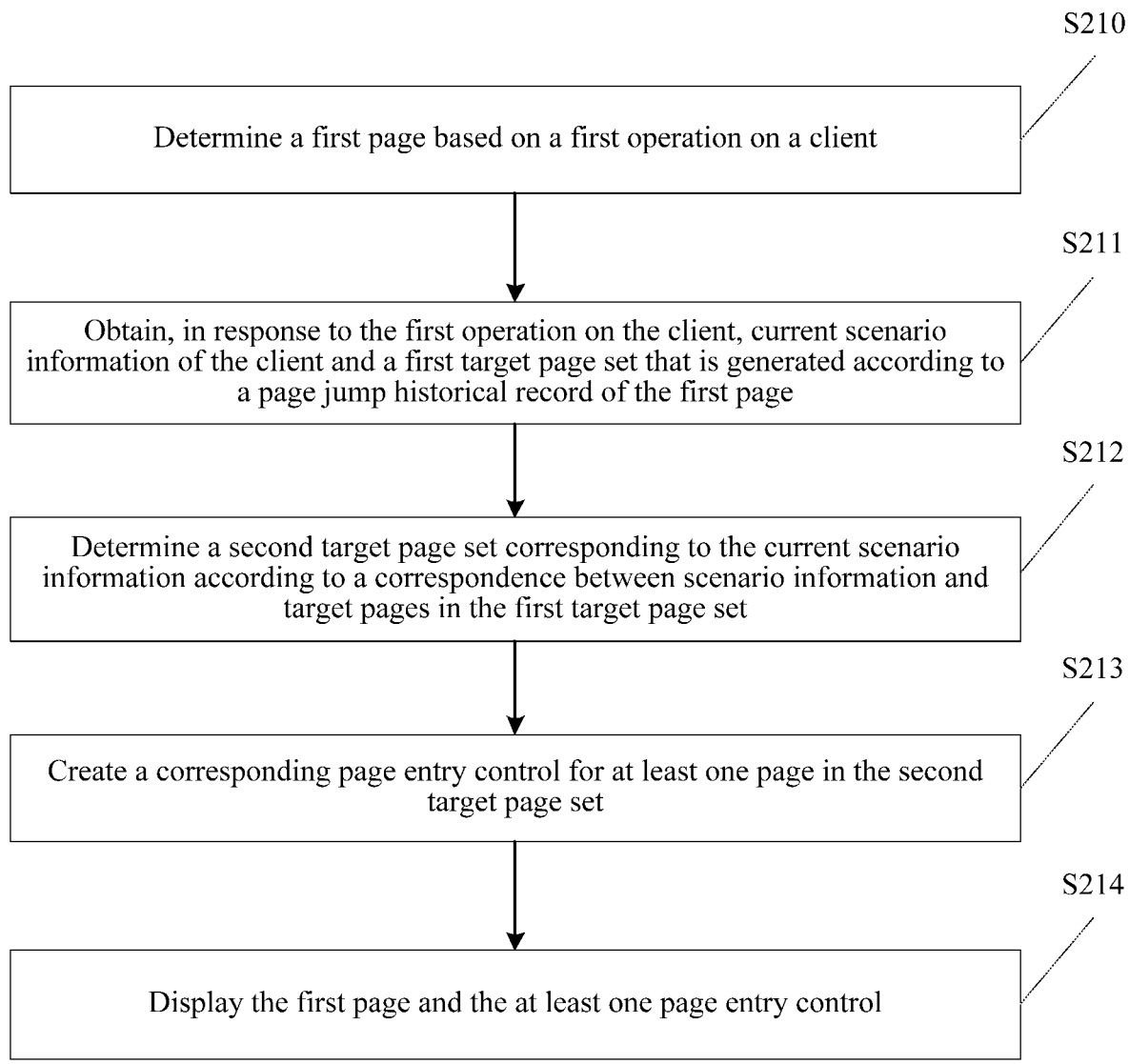
FIG. 2A is a schematic flowchart of a page display method according to embodiments of the present invention.

FIG. 2A is a schematic flowchart of a page display method in an embodiment of the present invention. Referring to FIG. 2A, the method includes the followings.

S210: Determining a first page based on a first operation on a client.

When a user opens an APP client on a terminal, the client starts to run according to a running operation, namely, the first operation, of the user, and determines the first page. In this case, the first page may be a boot page of the client, or may be a home page of the client. Certainly, the first operation may alternatively be an invoking operation of invoking the client by another APP. Then, the client determines a page invoked by the operation, that is, the first page, according to the invoking operation. In an actual application, the first operation and the first page in S210 may also be other pages, without limiting.

S211: Obtaining, in response to the first operation on the client, current scenario information of the client and a first target page set that is generated according to a page jump historical record of the first page.

The client may collect the current scenario information of the client in response to the first operation. As used herein, the scenario information may refer to any collectable information about a particular use scenario of the client, e.g., conditions and states of the client being used. For example, current time and a current position of the client are collected, and user information including gender and age of a login user of the client may also be included. At the same time, the client obtains identification information of the first page; and, according to a preset correspondence relationship between start pages and target page sets, determines the first target page set corresponding to the identification information of the first page.

For example, the foregoing correspondence between start pages and target page sets is generated by a server according to page jump operation records made by the user when using the client. The correspondence includes at least a correspondence between identification information of the pages and the target page sets.

S212: Determining a second target page set corresponding to the current scenario information according to a correspondence between scenario information and target pages in the first target page set.

For example, the target page set further includes a correspondence between scenario information and a target page. Then, after determining the first target page set, the client determines at least one target page corresponding to the current scenario information according to the correspondence between the scenario information and the target pages in the set. The target pages form the second target page set.

S213: Creating a corresponding page-entry control for at least one page in the second target page set.

S214: Displaying the first page and the at least one page-entry control.

In certain embodiments, S213 and S214 may include: the client creates a page-entry control, for example, a text input box, a virtual key, or a page icon, for all or some pages in the second target page set. When the first page is displayed, the at least one page-entry control is displayed. In this way, the user can quickly jump to the target page by using the page-entry control on the first page.

For example, assuming that the client creates a floating page-entry control, as shown in FIG. 2B-A, two page-entry controls, namely, a "search" icon 222 and a "download" icon 223 are floated or suspended on the lower left of the first page, for example, a zero-flow quick transfer service interface 221. Certainly, as shown in FIG. 2B-B, three page-entry controls, namely, a "switch" icon 225, a "custom" icon 226, and a "voice input" icon 227 are floated on the lower left of the first page, for example, a game page 224. Alternatively, as shown in FIG. 2B-C to FIG. 2B-E, four, five, or six page-entry controls 228 are separately displayed on the first page. Certainly, the number of the page-entry controls may also be any value, and is not limited in the present disclosure. The relative location of the floating page-entry control in the above figures are for illustrative purpose only, and not to be taken in a limiting sense. In alternative embodiments, the location of the floating page-entry control may be located in other locations, and may be moved or dragged to any locations as user desires.

Figure 2C:
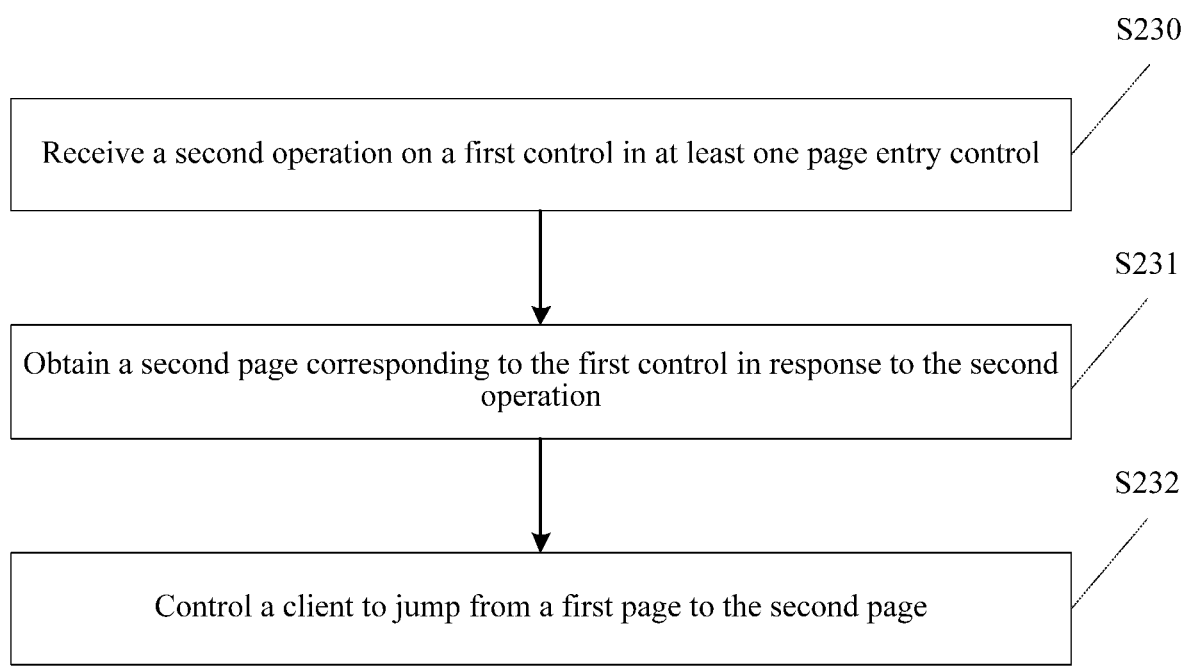

After the at least one page-entry control is displayed, FIG. 2C is another schematic flowchart of the page display method in the present disclosure. Referring to FIG. 2C, after S214, the method further includes the followings.

S230: Receiving a second operation on a first control in the at least one page-entry control.

S231: Obtaining a second page corresponding to the first control in response to the second operation.

S232: Controlling the client to jump from the first page to the second page.

After S214, at least one page-entry control is displayed on the first page. In this case, the user may perform operation on one of them. Referring to FIG. 2B-A, the user performs second operation, namely, a click operation on a first control, for example, a "search" icon in two page-entry controls. In this case, the client receives the second operation, and determines the second page, that is, a search page, corresponding to the first control according to the correspondence between a control and a page in response to the operation. Then, the client controls a display page of the client to jump from the first page to the second page.

For example, the first target page set is a set of target pages to which the first page jumps in a process of using the client by a user, and the target pages are pages to which the user most likely to jump under the first page. Then, the second target page set determined from the first target page set according to the current scenario information is a set of target pages to which the user most likely to jump in the current scenario.

Figure 3:
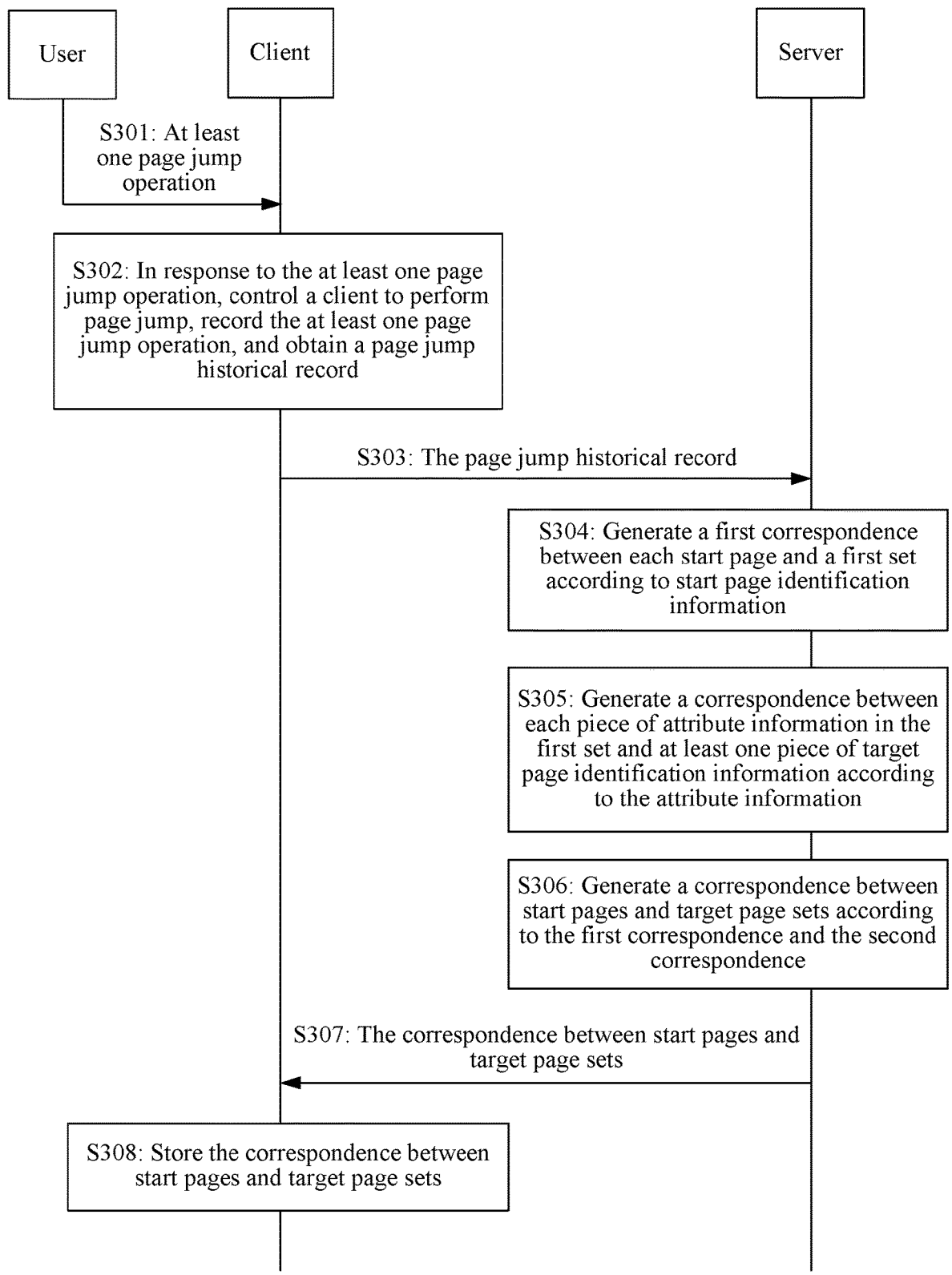
FIG. 3 is another schematic flowchart of a page display method according to embodiments of the present invention.

For determining a target page for a user more accurately, FIG. 3 is another schematic flowchart of a page display method in the present disclosure. Referring to FIG. 3, the method further includes the followings.

S301: A client receives at least one page jump operation of a user on a client terminal.

S302: The client controls, in response to the at least one page-jump operation, the client to perform page jump, records the at least one page-jump operation, and obtains a page jump historical record.

In a process of daily use of the client by the user, the at least one page-jump operation, for example, jumping from a page A to a page B, or returning to the page A from a page C, is performed on different pages of the client. Each time the client receives a page jump operation of the user, the client records the jump operation when responding to the jump operation, and writes the jump operation into the page jump historical record. The record may include: start page identification information, target page identification information, and attribute information such as the operation time and current position of the page jump operation. For example, the attribute information is used to represent scenario information of the client when the client executes the page jump operation.

In an actual application, parameters included in the attribute information may vary according to different types of the client. For example, when the client is an application market, the attribute information may include an operation time. For another example, when the client is a communication social application, the attribute information may further include a geographical position, a user gender, and the like in addition to the operation time. The parameter dimensions may need to be continuously optimized and adjusted according to different properties of the client, and are subject to actual application. This is not limited in the present disclosure.

In an implementation process, the client may only record some of operations satisfying a preset first condition, to reduce the amount of data to be processed. The step of recording the at least one page-jump operation in S302 may include: determining whether a start page of a page jump operation is a page of a preset type; if yes, recording the page jump operation; if not, determining whether an accumulated value corresponding to the start page reaches a preset threshold, and when the accumulated value reaches the threshold, recording the page jump operation. The accumulated value may correspond to the total time length spend on a specific page, or the number of times the user jumps to the specific page.

Further, after receiving a page jump operation, the client first determines whether a start page of the operation, namely, a page currently displayed by the client, is a page of a preset type, for example, a key page, or a functional page. If yes, the client records the page jump operation, and if not, the client further determines whether an accumulated value corresponding to the start page reaches a threshold; if the accumulated value corresponding to the start page reaches the threshold, the client records the page jump operation, and otherwise, the client adds 1 to an accumulator, and returns to S301.

It should be noted that, in the present disclosure, the client divides pages into three types, namely, a key page, a functional page, and an auxiliary page. The key page refers to a page most frequently used by the user. The pages usually have some fixed quick page entries. The page entries are usually for the user to jump to other secondary pages, but due to limited space, not many page entries can be displayed. This type of page is a page that often displays the quick page entries. The key pages include, for example, a home page, a software tab page, a game tab page, and a setting home page of the client. The functional page refers to a secondary page and the importance of a secondary page is not as strong as that of the key page, but these secondary pages may possibly be pages to which the user most needs to jump to, because the pages are usually core display pages of a particular function. The functional pages include, for example, a search page, an update page, and a download page in the client. Auxiliary page: this type of page is usually an auxiliary page of a client page, and usually has single functions, and simple operation with a use frequency that is not excessively high. For example, many detailed setting pages in the client belong to this type of page. Thus, when collecting data locally, the client mainly collects a link jumping from the key page to the functional page according to level classification of pages. For the auxiliary page, the number of usage times of the user may be temporarily collected. If the number of usage times reaches a particular threshold, the auxiliary page is added to a list of pages whose data needs to be collected.

S303: The client sends the page jump historical record to a server.

The page jump historical record is used to instruct the server to generate a correspondence between start pages and target page sets. For example, the client sends page jump historical records to the server periodically in preset duration, such as 1 hour, 1 day, 1 week, or 1 month.

S304: The server generates a first correspondence between each start page and a first set according to start page identification information.

The first set includes corresponding target page identification information and attribute information.

After receiving the page jump historical record reported by the client, the server parses the page jump historical record, extracts the start page identification information and the target page identification information that correspond to each page jump operation, and attribute information of the operation. The server then generates a first correspondence between each start page and the first set according to the start page identification information. That is, the server groups target page identification information corresponding to the page jump operation having the same start page identification information in the page jump historical record and the attribute information of the operation into the first set, and then associates the start page identification information with the first set corresponding thereto, to establish the first correspondence.

S305: The server generates a second correspondence between each piece of attribute information in the first set and at least one piece of target page identification information according to the attribute information.

In certain embodiments of the present disclosure, S305 may include: determining target page identification information associated with same attribute information in the first set as a third set, determining target page identification information satisfying a second condition in the third set as the at least one piece of target page identification information; and establishing the second correspondence between each piece of attribute information in the first set and the at least one piece of target page identification information.

Further, the server determines target page identification information associated with same attribute information in the first set as a third set, then selects, from the third set, at least one piece of target page identification information most associated with the attribute information that is in the target page identification information satisfying the preset second condition, and establishes the second correspondence between each piece of attribute information in the first set and the at least one piece of target page identification information. The preset second condition may be target page identification information whose number of times of occurring ranks top 5, top 10, or top 15 in the third set, or may be target page identification information whose number of jump paths is greater than 3 or 5. In actual applications, the preset second condition may also be other conditions, which is not limited in the present disclosure.

S306: The server generates a correspondence between start pages and target page sets according to the first correspondence and the second correspondence.

After obtaining the first correspondence and the second correspondence, the server associates the first correspondence with the second correspondence by using the attribute information, to generate a correspondence between start pages and target page sets.

S307: The server sends the correspondence between start pages and target page sets to the client.

S308: The client stores the correspondence between start pages and target page sets.

In certain embodiments of the present disclosure, after S308, S210 to S214 may be performed.

Figure 4A:
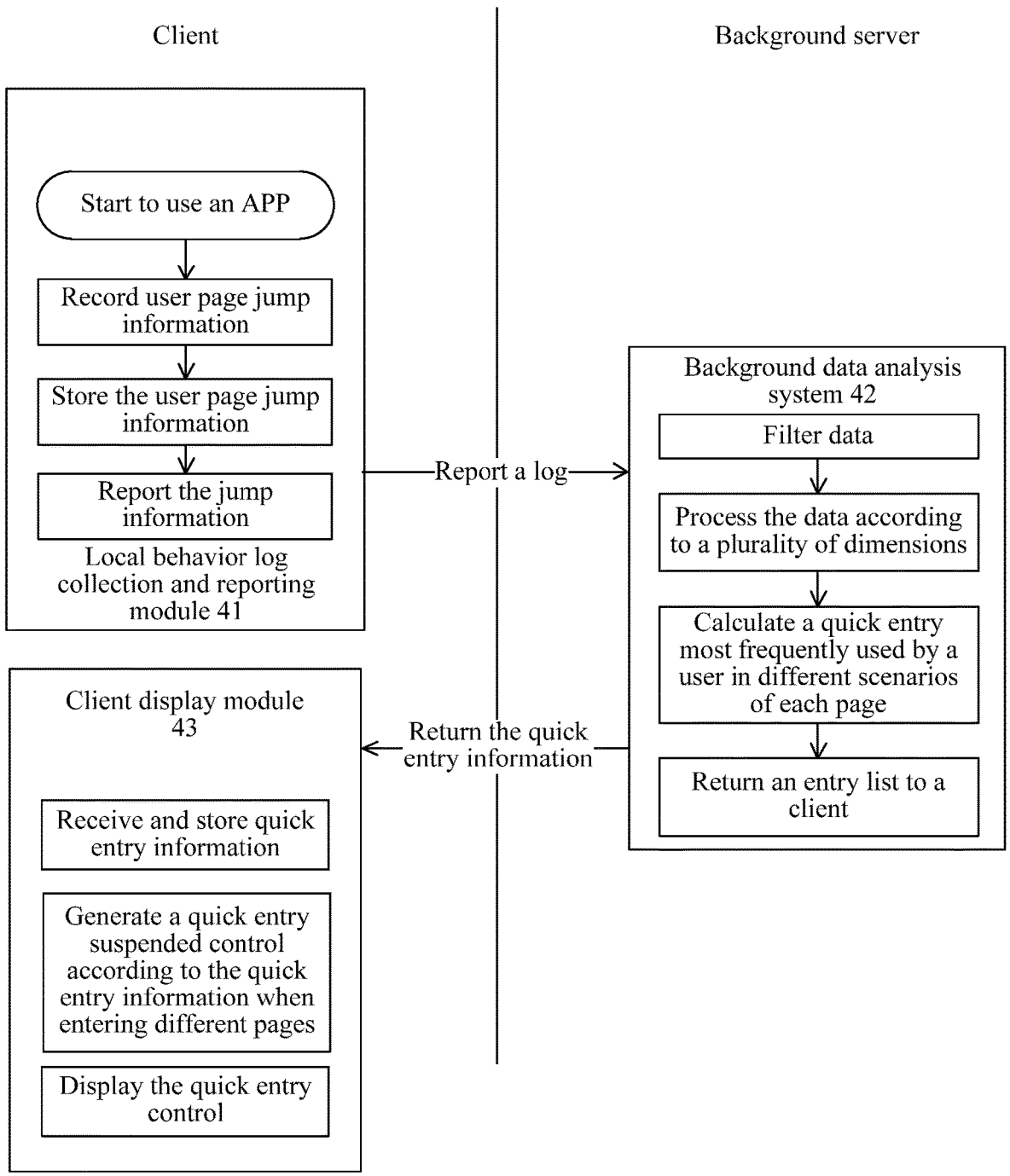
FIG. 4A is a schematic structural diagram of a page display system according to embodiments of the present invention.

FIG. 4A is a schematic structural diagram of a page display system in an embodiment of the present disclosure. Referring to FIG. 4A, the system includes: a local behavior log collection and reporting module 41, a back-end data analysis system 42, and a data protocol and client display module 43.

The local behavior log collection and reporting module 41 and the data protocol and client display module 43 may be located on the client side, and the back-end data analysis system 42 may be located on a back-end server side.

For example, the local behavior log collection and reporting module is responsible for collecting a page jump behavior of a user, and reporting the collected data to the back-end server.

In an actual application, to effectively collect a behavior log, pages of the client first need to be classified from the perspective of functions, and are divided into the key pages, functional pages, and auxiliary pages. Then, when collecting data locally, the client mainly collects a link jumping from the key page to the functional page according to level classification of pages. For the auxiliary page, a number of usage times of the user may be temporarily collected. If the number of times reaches a particular degree, the auxiliary page is added to a list of pages whose data needs to be collected.

Further, other dimensions may further be considered in data collection. For example, Application Treasure is a download market, and therefore a time dimension is a factor that needs to be mainly considered. However, for a communication social APP, a geographical position, a user gender, and other dimensions further need to be considered. The dimensions need to be continuously optimized and adjusted according to different properties of APPs. Further, some additional information, for example, current time and a current geographical position, further needs to be carried during data collection. If a user logs into the APP, some basic information such as gender and age of the user may be further carried. Based on the information, different quick page entries can be recommended more accurately for the user according to different scenarios.

The foregoing back-end data analysis system is responsible for summarizing and sorting user jump behavior data reported by the client, and calculating, through a plurality of dimensions, a page to which the user most likely to jump under a particular condition.

Figure 4B:
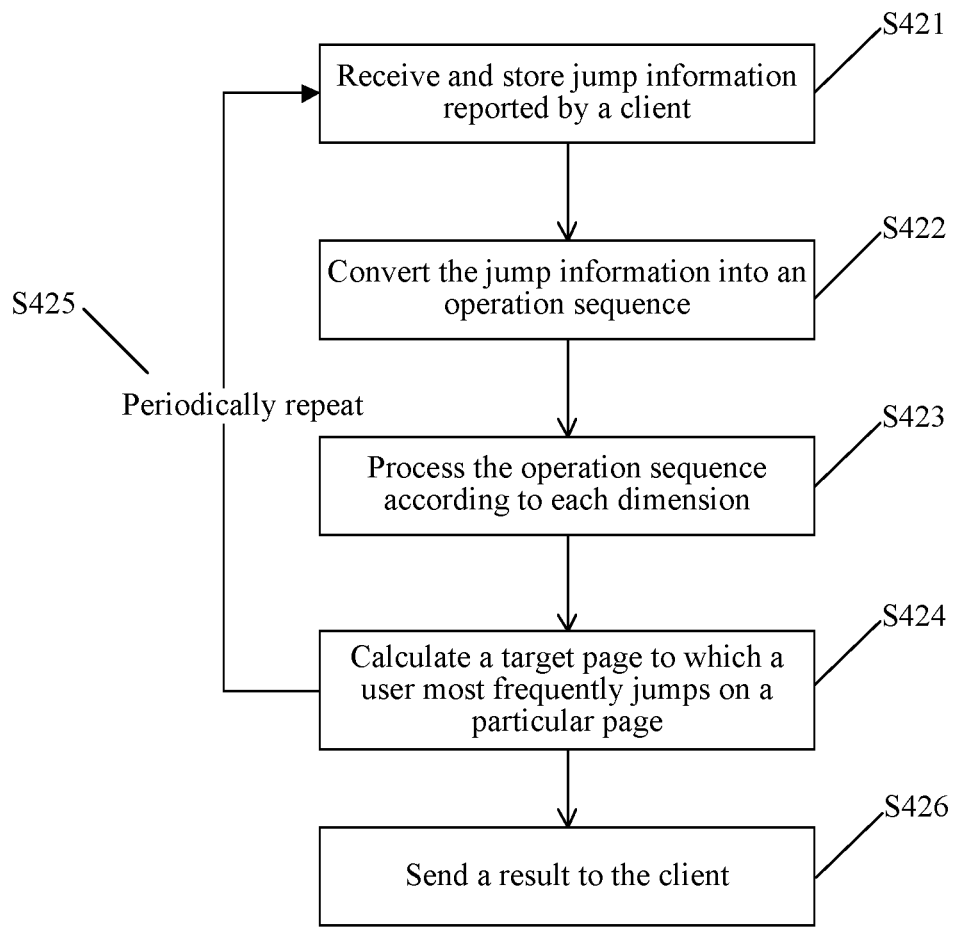
FIG. 4B is a flowchart of back-end data analysis and processing according to embodiments of the present invention.

FIG. 4B is a flowchart of back-end data analysis and processing in an embodiment of the present disclosure. Referring to FIG. 4B, the back-end data analysis and processing method includes the followings.

S421: Receiving and storing jump information reported by a client.

S422: Converting the jump information into an operation sequence.

The key page is defined as 0, the functional page is defined as 1, the auxiliary page is defined as 2, and the back key is defined as −1. For example, if operation of a user starts from the key page, and then returns to the key page through a returning operation, the foregoing operation is sorted into an operation sequence, namely, 0 to 2 to 1 to −1 to 0.

S423: Processing the operation sequence according to each dimension.

The statistics are then collected on the foregoing filtered operation sequences according to reported attribute information such as the position and time, to calculate a behavior habit of the user, and then data of all users of each page is sorted and summarized.

S424: Calculating a target page to which a user most frequently jumps on a particular page.

A target page to which each page most frequently jumps in a specific scenario is calculated. The page is a quick page entry that needs to be displayed on the current page, and calculated entry information is stored.

S425: Periodically and continuously repeating S421 to S424.

S426: Sending the result to the client.

For example, the server sends the foregoing result to the client by using a data protocol.

The foregoing data protocol and client display module is responsible for receiving data information returned by a back-end (e.g., a back-end server), and generating a quick page entry on different pages according to the information for the user to use.

First, the client needs to define a same jump protocol for each jump page, and synchronizes the jump link with the back-end. The back-end needs to carry the corresponding jump link when delivering the quick page entry. By using this method, after the back-end dynamically configures the quick page entry, the user can jump to the correct page by clicking the quick page entry.

Further, the data protocol and client display module may generate different quick page entries on different pages according to a configuration delivered by the back-end. Pages of the generated quick page entries also vary with the number of the quick page entries. For example, the back-end delivers three quick page entries, and the client further provides a quick page entry that can be defined by the user. An interface of the quick page entry is shown in the following FIG. 2B-B to FIG. 2B-E. A "+" icon 227 indicates a quick page entry that can be defined by the user.

Similarly, the present disclosure also provides a page display terminal apparatus, which is applied to the client described above.

Figure 5A:
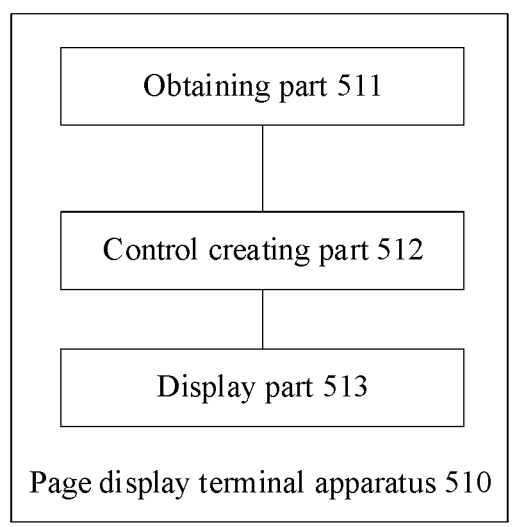
FIG. 5A is a structural diagram of a page display terminal apparatus according to embodiments of the present invention.

FIG. 5A is a schematic structural diagram of a page display terminal apparatus in an embodiment of the present disclosure. As shown in FIG. 5A, the terminal apparatus 510 includes an obtaining part 511, a control creating part 512, and a display part 513, etc.

The obtaining part 511 is configured to: obtain, based on a first operation on a client, a first page and obtain current scenario information of the client and a first target page set that is generated according to a page jump historical record of the first page. The control creating part 512 is configured to: determine a second target page set corresponding to the current scenario information according to a correspondence between scenario information and target pages in the first target page set and create a corresponding page-entry control for at least one page in the second target page set. The display part 513 is configured to display the first page and the at least one page-entry control.

In certain embodiments, the obtaining part 511 is further configured to: determine a first page based on a first operation on a client; obtain, in response to the first operation on the client, current scenario information of the client and a first target page set that is generated according to a page jump historical record of the first page.

In certain embodiments of the present disclosure, the obtaining part 511 is configured to: obtain identification information of the first page; and determine the first target page set corresponding to the identification information of the first page according to a preset correspondence between start pages and target page sets.

In certain embodiments of the present disclosure, the apparatus further includes: a first receiving part, configured to receive at least one page-jump operation of a user on the client; a control part, configured to: control, in response to the at least one page jump operation, the client to perform page jump, record the at least one page-jump operation, and obtain the page jump historical record; and a first sending part, configured to send the page jump historical record to a server, where the page jump historical record is used to instruct the server to generate a correspondence between start pages and target page sets.

In certain embodiments of the present disclosure, the control part is configured to determine whether a start page of the page jump operation is a page of a preset type; if yes, record the page jump operation; and otherwise, determine whether an accumulated value corresponding to the start page reaches a threshold, and record the page jump operation when the accumulated value reaches the threshold.

In certain embodiments of the present disclosure, the first receiving part is configured to receive a second operation on a first control in the at least one page-entry control after the at least one page-entry control is displayed. The control part is configured to obtain a second page corresponding to the first control in response to the second operation. The first sending part is configured to control the client to jump to the second page from the first page.

It should be noted herein that the description of the foregoing apparatus embodiment is similar to the description of the foregoing method, and the apparatus embodiment has beneficial effects the same as those of the method embodiment, and therefore details are not described. A person skilled in the art should refer to the description of the method embodiment of the present disclosure for understanding of the technical details that are not disclosed in the apparatus embodiment of the present disclosure.

Further, the present disclosure also provides a page display server apparatus, which is applied to the server described above.

Figure 5B:
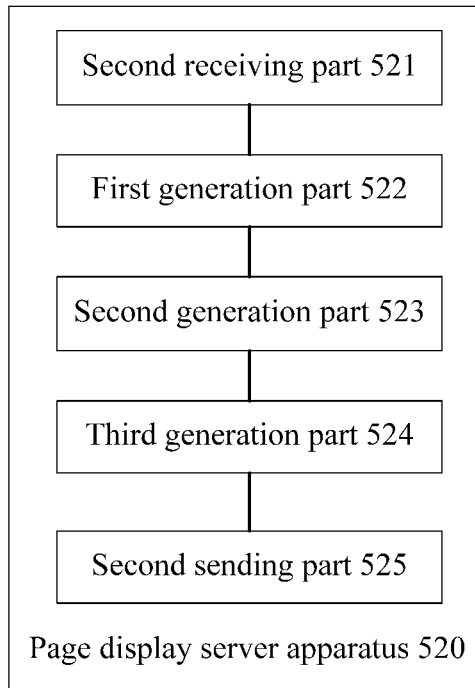
FIG. 5B is a structural diagram of a page display server apparatus according to embodiments of the present invention.

FIG. 5B is a schematic structural diagram of a page display server apparatus in an embodiment of the present disclosure. Referring to FIG. 5B, the apparatus 520 includes a second receiving part 521, a first generation part 522, a second generation part 523, a third generation part 524, and a second sending part 525, etc.

The second receiving part 521 is configured to receive a page jump historical record sent by a client, the page jump historical record including start page identification information, target page identification information, and attribute information of at least one page-jump operation, and the attribute information being used to represent scenario information of the client when the client executes the page jump operation.

The first generation part 522 is configured to generate a first correspondence between each start page and a first set according to the start page identification information, the first set including corresponding target page identification information and attribute information. The second generation part 523 is configured to generate a second correspondence between each piece of attribute information in the first set and at least one piece of target page identification information according to the attribute information.

Further, the third generation part 524 is configured to generate a correspondence between start pages and target page sets according to the first correspondence and the second correspondence. The second sending part 525 is configured to send the correspondence between start pages and target page sets to the client.

In certain embodiments of the present disclosure, the second generation part is configured to: determine target page identification information associated with same attribute information in the first set as a third set, determine target page identification information satisfying a second condition in the third set as the at least one piece of target page identification information; and establish the second correspondence between each piece of attribute information in the first set and the at least one piece of target page identification information.

It should be noted herein that the description of the foregoing apparatus embodiment is similar to the description of the foregoing method, and the apparatus embodiment has beneficial effects the same as those of the method embodiment, and therefore details are not described. A person skilled in the art should refer to the description of the method embodiment of the present disclosure for understanding of the technical details that are not disclosed in the apparatus embodiment of the present disclosure.

Similarly, the present disclosure also provides a terminal consistent with the client described above.

Figure 6A:
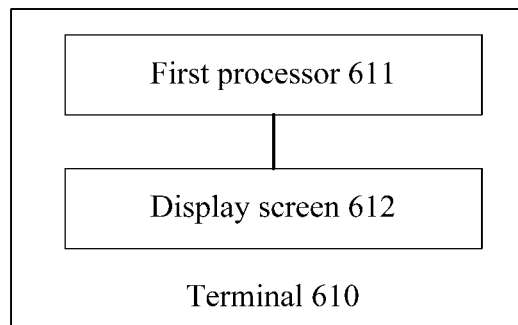
FIG. 6A is a schematic structural diagram of a terminal according to embodiments of the present invention.

FIG. 6A is a schematic structural diagram of a terminal in an embodiment of the present disclosure. Referring to FIG. 6A, the client 610 includes: a first processor 611, configured to: determine a first page based on a first operation on a client; obtain, in response to the first operation on the client, current scenario information of the client and a first target page set that is generated according to a page jump historical record of the first page; determine a second target page set corresponding to the current scenario information according to a correspondence between scenario information and target pages in the first target page set; and create a corresponding page-entry control for at least one page in the second target page set; and a display screen 612, configured to display the first page and the at least one page-entry control.

In certain embodiments of the present disclosure, the first processor is configured to: obtain identification information of the first page; and determine the first target page set corresponding to the identification information of the first page according to a preset correspondence between start pages and target page sets.

In certain embodiments of the present disclosure, the first processor is configured to: receive at least one page-jump operation of a user on the client; control, in response to the at least one page jump operation, the client to perform page jump, record the at least one page-jump operation, and obtain the page jump historical record; and send the page jump historical record to a server, where the page jump historical record is used to instruct the server to generate a correspondence between start pages and target page sets.

In certain embodiments of the present disclosure, the first processor is configured to determine whether a start page of the page jump operation is a page of a preset type; if yes, record the page jump operation; and otherwise, determine whether an accumulated value corresponding to the start page reaches a threshold, and record the page jump operation when the accumulated value reaches the threshold.

In certain embodiments of the present disclosure, the first processor is configured to: receive a second operation on a first control in the at least one page-entry control after the at least one page-entry control is displayed; obtain a second page corresponding to the first control in response to the second operation; and control the client to jump to the second page from the first page.

In certain embodiments of the present disclosure, the first processor is configured to store a sample parameter according to a time stamp.

In actual application, the foregoing first processor may be at least one of an application-specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It may be understood that the electronic device implementing the function of the first processor may alternatively be other cases, and is not limited in the present disclosure.

It should be noted herein that the description of the foregoing terminal embodiment is similar to the description of the foregoing method, and the terminal embodiment has beneficial effects the same as those of the method embodiment, and therefore details are not described. A person skilled in the art should refer to the description of the method embodiment of the present disclosure for understanding of the technical details that are not disclosed in the terminal embodiment of the present disclosure.

Similarly, the present disclosure also provides a server consistent with the server described above.

Figure 6B:
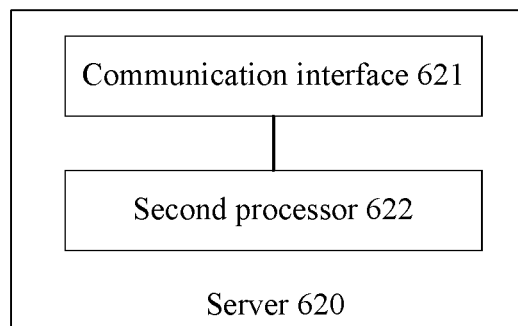
FIG. 6B is a schematic structural diagram of a server according to embodiments of the present invention.

FIG. 6B is a schematic structural diagram of a server in an embodiment of the present disclosure. Referring to FIG. 6B, the server 620 includes: a communication interface 621, configured to receive a page jump historical record sent by a client, the page jump historical record including start page identification information, target page identification information, and attribute information of at least one page-jump operation, and the attribute information being used to represent scenario information of the client when the client executes the page jump operation; and further configured to send the correspondence between start pages and target page sets to the client; and a second processor 622, configured to: generate a first correspondence between each start page and a first set according to the start page identification information, the first set including corresponding target page identification information and attribute information; generate a second correspondence between each piece of attribute information in the first set and at least one piece of target page identification information according to the attribute information; and generate a correspondence between start pages and target page sets according to the first correspondence and the second correspondence.

In certain embodiments of the present disclosure, the second processor is configured to: determine target page identification information associated with same attribute information in the first set as a third set, determine target page identification information satisfying a second condition in the third set as the at least one piece of target page identification information; and establish the second correspondence between each piece of attribute information in the first set and the at least one piece of target page identification information.

In certain embodiments of the present disclosure, the second processor is configured to store a sample parameter according to a time stamp.

In actual application, the second processor may be at least one of an ASIC, a DSP, a DSPD, a PLD, an FPGA, a CPU, a controller, a microcontroller, and a microprocessor. It may be understood that the electronic device implementing the function of the second processor may alternatively be other cases, and is not limited in the present disclosure.

It should be noted herein that the description of the foregoing server embodiment is similar to the description of the foregoing method, and the server embodiment has beneficial effects the same as those of the method embodiment, and therefore details are not described. A person skilled in the art should refer to the description of the method embodiment of the present disclosure for understanding of the technical details that are not disclosed in the server embodiment of the present disclosure.

It should be noted that in the embodiments of the present disclosure, when the page display method is implemented in a form of a software functional module, the page display method may alternatively be stored in a computer-readable storage medium. Based on such an understanding, the technical solutions of the embodiments of the present disclosure essentially, or the part contributing to the existing technology may be reflected in a form of a software product. The computer software product is stored in a storage medium and includes several instructions for instructing a computing device (which may be a personal computer, a server, a network device, or the like) to perform all or a part of the methods of various embodiments of the present disclosure. The foregoing storage medium includes: any medium that can store program code, such as a USB flash drive, a removable hard disk, a read-only memory (ROM), a magnetic disk, or an optical disc. In this way, the embodiments of the present disclosure are not limited by any combination of specific hardware and software.

An embodiment of the present disclosure provides a terminal, including a memory and a processor, the memory storing a computer program that can be run on the processor, and the processor implementing the steps in the page display method on the terminal side when executing the program.

An embodiment of the present disclosure provides a server, including a memory and a processor, the memory storing a computer program that can be run on the processor, and the processor implementing the steps in the page display method on the server side when executing the program.

An embodiment of the present disclosure provides a computer readable storage medium, storing a computer program, the computer program implementing the steps in the page display method on the terminal side when executed by a processor, or the computer program implementing the steps in the page display method on the server side when executed by the processor.

It should be noted herein that the descriptions of the foregoing storage medium and device embodiments are similar to the description of the foregoing method embodiment, and the storage medium and device embodiments have beneficial effects similar to those of the method embodiment. For understanding of technical details that are not disclosed in the storage medium and device embodiments of the present disclosure, refer to the description of the method embodiment of the present disclosure.

The term "client" or "server" includes all types of apparatuses, devices and machines configured to process data, such as a programmable processor, a computer, an on-chip system, or a plurality of or combinations of the foregoing. The apparatus can include a dedicated logic circuit, such as an FPGA or an ASIC. In addition to hardware, the apparatus can also include code for creating an execution environment for a computer program of interest, such as firmware that forms a processor, a protocol stack, a database management system, am operating system, a cross-platform operating environment, a virtual machine or one or more combinations thereof. The apparatus and execution environment enable the implementation of various different computing model infrastructures, such as network services, distributed computing, and grid computing infrastructures.

Although the specification includes many implementation details, these implementation details should not be interpreted as limiting the scope of any claim, instead, as describing features specific to specific implementations. The specific features described in the context of independent implementations of the specification can also be implemented in a combination of single implementations. Conversely, the features described in the context of a single implementation can also be implemented separately in a plurality of implementations or in any suitable sub-combination. Moreover, although features can be described above as functions in a particular combination or even as initially required, in some cases, one or more features of the required combination can be removed from the combination, and the required combination can be sub-combinations or variants of sub-combinations.

Similarly, although the operation is depicted in a particular order in the accompanying drawings, it should not be construed as requiring that the operation be performed in the specified order shown or sequentially, or that all the operations shown are performed to achieve the desired results. Multitask processing and parallel processing can be advantageous in specific environments. In addition, the separation of system components in the foregoing implementations should not be construed as requiring to implement the separation in all implementations, and it should be understood that the described program components and systems can usually be integrated in a single software product or encapsulated into a plurality of software products.

What is claimed is:

1. A page display method, comprising:
receiving a page jump operation on a client;
controlling, in response to the page jump operation, the client to perform page jump;
determining whether a start page of the page jump operation belongs to a preset type, wherein types of pages include: a key page type referring to a page including multiple fixed entries to other pages, a functional page type referring to a secondary page of a key page, and an auxiliary page type referring to a settings page in the client; and the preset type includes at least one of the key page type or the functional page type;
when the start page belongs to the preset type, recording the page jump operation to a page jump historical record;
when the start page of the page jump operation does not belong to the preset type, determining whether an accumulated value corresponding to the start page reaches a threshold;
when the accumulated value reaches the threshold, recording the page jump operation to the page jump historical record;
when the accumulated value does not reach the threshold, updating the accumulated value and skipping recording the page jump operation;
sending the page jump historical record to a server, wherein the page jump historical record is used to instruct the server to generate the correspondence between start pages and target page sets;
determining a first page based on a first operation on the client;
obtaining, in response to the first operation on the client, current scenario information of the client and a first target page set that is generated according to the page jump historical record of the first page;

determining a second target page set corresponding to the current scenario information according to a correspondence between scenario information and target pages in the first target page set;

creating a corresponding page-entry control for at least one page in the second target page set; and displaying the first page and the page-entry control for the at least one page.

2. The method according to claim 1, wherein the obtaining a first target page set that is generated according to a page jump historical record of the first page comprises:

obtaining identification information of the first page; and determining the first target page set corresponding to the identification information of the first page according to a correspondence between start pages and target page sets.

3. The method according to claim 1, wherein:

the page jump historical record comprises start page identification information, target page identification information, and attribute information of the at least one page-jump operation; and the attribute information is used to represent scenario information of the client when the client executes the page jump operation.

4. The method according to claim 1, wherein, after the displaying the at least one page-entry control, the method further comprises:

receiving a second operation on a first control in the at least one page-entry control;

obtaining a second page corresponding to the first control in response to the second operation; and controlling the client to jump to the second page from the first page.

5. A terminal, comprising:

a memory for storing program code;

a display screen; and a first processor coupled to the memory and the display screen, and configured to:

receive a page jump operation on a client;

control, in response to the page jump operation, the client to perform page jump;

determine whether a start page of the page jump operation belongs to a preset type, wherein types of pages include: a key page type referring to a page including multiple fixed entries to other pages, a functional page type referring to a secondary page of a key page, and an auxiliary page type referring to a settings page in the client; and the preset type includes at least one of the key page type or the functional page type;

when the start page belongs to the preset type, record the page jump operation to a page jump historical record;

when the start page of the page jump operation does not belong to the preset type, determine whether an accumulated value corresponding to the start page reaches a threshold;

when the accumulated value reaches the threshold, record the page jump operation to the page jump historical record;

when the accumulated value does not reach the threshold, update the accumulated value and skipping recording the page jump operation;

send the page jump historical record to a server, wherein the page jump historical record is used to instruct the server to generate the correspondence between start pages and target page sets;

determine a first page based on a first operation on the client;

obtain, in response to the first operation on the client, current scenario information of the client and a first target page set that is generated according to the page jump historical record of the first page;

determine a second target page set corresponding to the current scenario information according to a correspondence between scenario information and target pages in the first target page set; and create a corresponding page-entry control for at least one page in the second target page set, wherein the display screen is configured to display the first page and the page-entry control for at least one page.

6. The terminal according to claim 5, wherein, to obtain a first target page set that is generated according to a page jump historical record of the first page, the first processor is further configured to:

obtain identification information of the first page; and determine the first target page set corresponding to the identification information of the first page according to a correspondence between start pages and target page sets.

7. The terminal according to claim 5, wherein:

the page jump historical record comprises start page identification information, target page identification information, and attribute information of the at least one page-jump operation; and the attribute information is used to represent scenario information of the client when the client executes the page jump operation.

8. The terminal according to claim 5, wherein the first processor is further configured to:

receive a second operation on a first control in the at least one page-entry control;

obtain a second page corresponding to the first control in response to the second operation; and control the client to jump to the second page from the first page.

9. The method according to claim 1, wherein:

the page-entry control is a floating control shown on top of the first page; and the page-entry control is configured to be moved or dragged based on a user operation.

10. The method according to claim 1, further comprising:

collecting a link jumping from a key page to a functional page according to level classification of pages for the page jump historical record.

11. The method according to claim 1, further comprising:

when the start page of the page jump operation does not belong to the preset type and the accumulated value corresponding to the start page reaches the threshold, adding the start page to a list of pages whose data needs to be collected.

12. A non-transitory computer readable storage medium storing computer instructions, the computer instructions, when being executed by a processor, causing the processor to perform:

receiving a page jump operation on a client;

controlling, in response to the page jump operation, the client to perform page jump;

determining whether a start page of the page jump operation belongs to a preset type, wherein types of pages include: a key page type referring to a page including multiple fixed entries to other pages, a functional page type referring to a secondary page of a key page, and an auxiliary page type referring to a settings page in the client and the preset type includes at least one of the key page type or the functional page type;

when the start page belongs to the preset type, recording the page jump operation to a page jump historical record;

when the start page of the page jump operation does not belong to the preset type, determining whether an accumulated value corresponding to the start page reaches a threshold;

when the accumulated value reaches the threshold, recording the page jump operation to the page jump historical record;

when the accumulated value does not reach the threshold, updating the accumulated value and skipping recording the page jump operation;

sending the page jump historical record to a server, wherein the page jump historical record is used to instruct the server to generate the correspondence between start pages and target page sets;

determining a first page based on a first operation on the client;

obtaining, in response to the first operation on the client, current scenario information of the client and a first target page set that is generated according to the page jump historical record of the first page;

determining a second target page set corresponding to the current scenario information according to a correspondence between scenario information and target pages in the first target page set;

creating a corresponding page-entry control for at least one page in the second target page set; and displaying the first page and the page-entry control for the at least one page.

13. The storage medium according to claim 12, wherein the obtaining a first target page set that is generated according to a page jump historical record of the first page comprises:

obtaining identification information of the first page; and determining the first target page set corresponding to the identification information of the first page according to a correspondence between start pages and target page sets.

14. The storage medium according to claim 12, wherein:

the page jump historical record comprises start page identification information, target page identification information, and attribute information of the at least one page-jump operation; and the attribute information is used to represent scenario information of the client when the client executes the page jump operation.

15. The storage medium according to claim 12, wherein, after the displaying the at least one page-entry control, the computer instructions further cause the processor to perform:

receiving a second operation on a first control in the at least one page-entry control;

obtaining a second page corresponding to the first control in response to the second operation; and controlling the client to jump to the second page from the first page.

* * * * *